Sept 10, 1957 G. H. RIDINGS ET AL 2,806,081

FACSIMILE SCANNER

Original Filed Nov. 16, 1948 6 Sheets-Sheet 1

INVENTORS
G. H. RIDINGS
J. H. HACKENBERG
BY Edward R. Hyde Jr.
ATTORNEY

INVENTORS
G. H. RIDINGS
J. H. HACKENBERG
BY Edward R. Hyde Jr.
ATTORNEY

Sept 10, 1957 G. H. RIDINGS ET AL 2,806,081

FACSIMILE SCANNER

Original Filed Nov. 16, 1948 6 Sheets-Sheet 3

INVENTORS
G. H. RIDINGS
J. H. HACKENBERG

BY Edward R. Hyde Jr.
ATTORNEY

FACSIMILE SCANNER

Original Filed Nov. 16, 1948

6 Sheets-Sheet 4

INVENTORS
G. H. RIDINGS
J. H. HACKENBERG
BY Edward R. Hyde Jr.
ATTORNEY

FACSIMILE SCANNER

Original Filed Nov. 16, 1948

INVENTORS
G. H. RIDINGS
J. H. HACKENBERG
BY Edward R. Hyde Jr.
ATTORNEY

Sept 10, 1957 G. H. RIDINGS ET AL 2,806,081

FACSIMILE SCANNER

Original Filed Nov. 16, 1948 6 Sheets-Sheet 6

*INVENTORS*
G. H. RIDINGS
J. H. HACKENBERG
*BY* Edward R. Hyde Jr.
ATTORNEY

United States Patent Office 2,806,081

Patented Sept. 10, 1957

2,806,081

FACSIMILE SCANNER

Garvice H. Ridings, Summit, N. J., and John H. Hackenberg, Flushing, N. Y., assignors to The Western Union Telegraph Company, New York, N. Y., a corporation of New York Original application November 16, 1948, Serial No. 60,334, now Patent No. 2,647,945, dated August 4, 1953. Divided and this application January 8, 1953, Serial No. 330,342

5 Claims. (Cl. 178—5)

This invention relates to facsimile scanning and more particularly to a scanning device employing a stylus for direct scanning of the subject copy.

The present application is a division of applicants' application Serial No. 60,334, filed November 16, 1948, now U. S. Patent No. 2,647,945, granted August 4, 1953. The latter application discloses a facsimile system including a portable transmitter communicating with a distant receiver. The instant invention is concerned with the portable transmitter and particularly to the arrangement of the stylus type scanning head.

The portable transmitter herein disclosed was especially designed to operate under severe conditions such as would prevail, for example, in a field of hostilities where a soldier in an advanced position is to send information to a headquarters position. In order to meet these conditions, the transmitter must be of rugged construction and adapted for quick and convenient operation.

The transmitter has therefore been designed to operate with a conducting paper on which the subject matter to be transmitted (such as a map, sketch, diagram and the like) is marked with a pencil of soft graphite. After the information has been written on a sheet of the paper, the operator mounts the sheet on a rotary drum where it is scanned by an electric stylus. The pencil markings are conducting as compared with the high resistance of the unmarked paper and cause the stylus to produce voltage variations in the grid circuit of a vacuum tube.

Accordingly, it is an object of this invention to provide a portable facsimile scanner of simple and rugged construction.

A further object of the invention is to provide a locking arrangement for a facsimile stylus and scanning carriage to prevent oscillation and swinging thereof when not in use.

Another object is to provide a means whereby constant stylus pressure is exerted on a scanning carriage of a facsimile transmitter.

These and other objects of the invention will be more fully understood from the following description taken in conjunction with the drawings in which—

Figs. 1 and 2 together represent a top view of the transmitter, these two figures joining along the line A—A;

Figure 2:
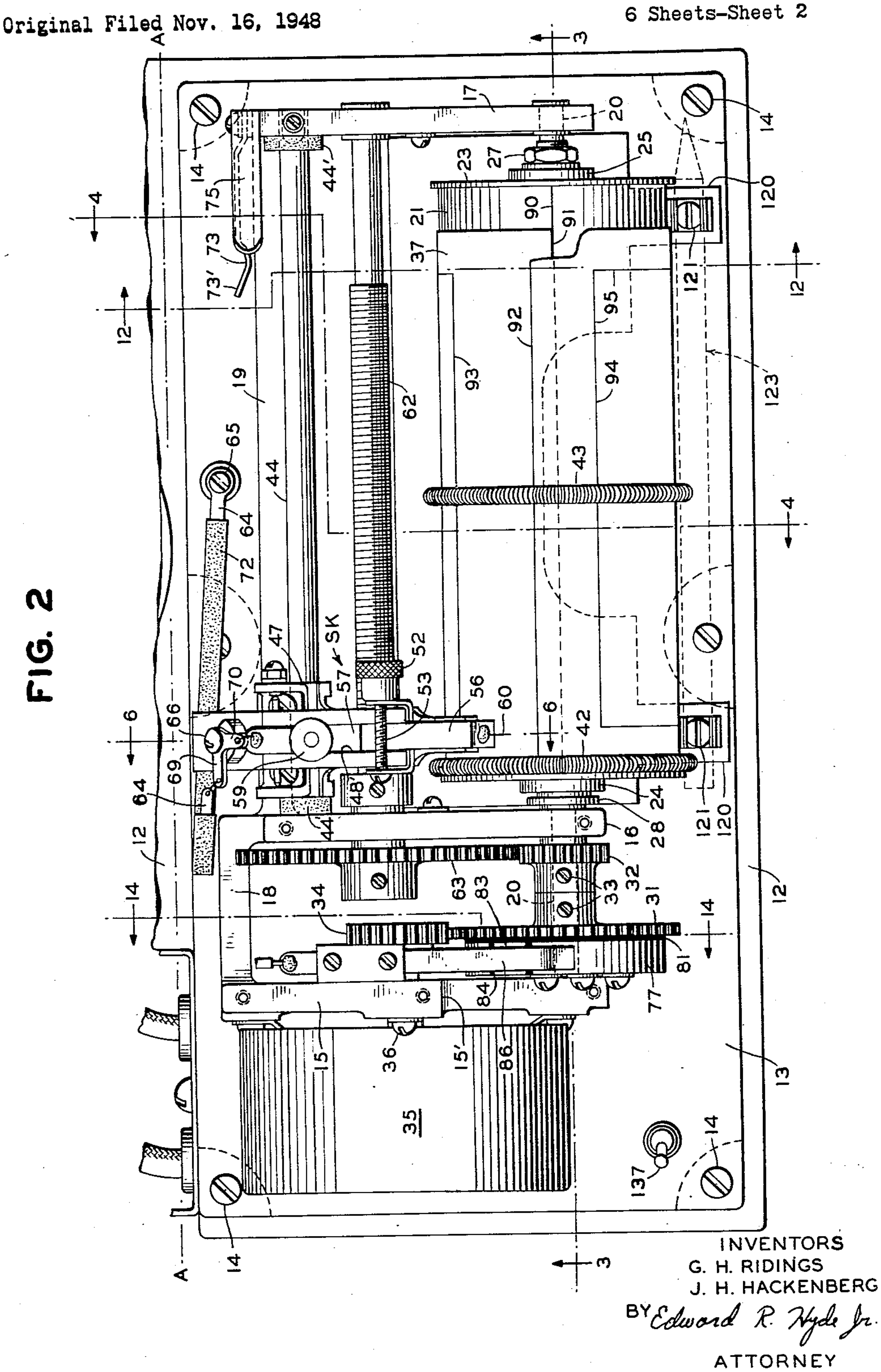
Figure 6:
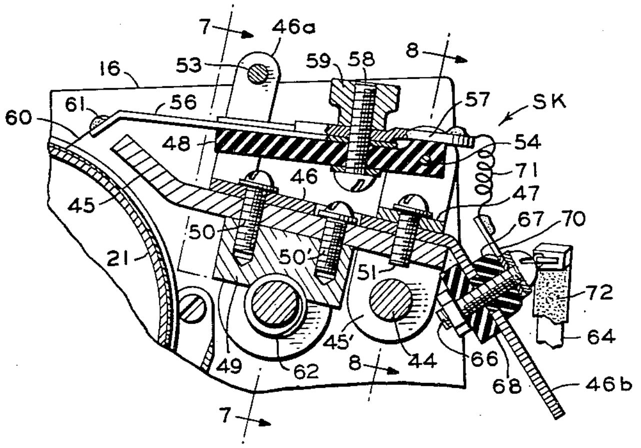
Fig. 6 shows an enlarged section through the stylus carriage on line 6—6 of Fig. 2.
Figure 7:
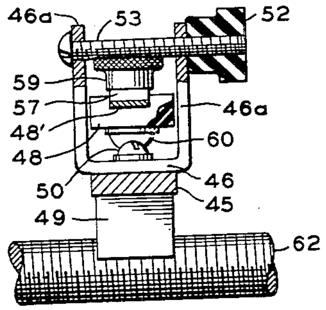
Figure 8:
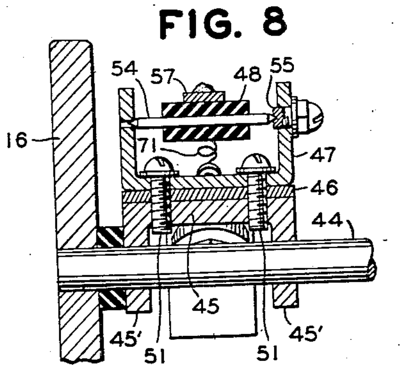
Figure 9:
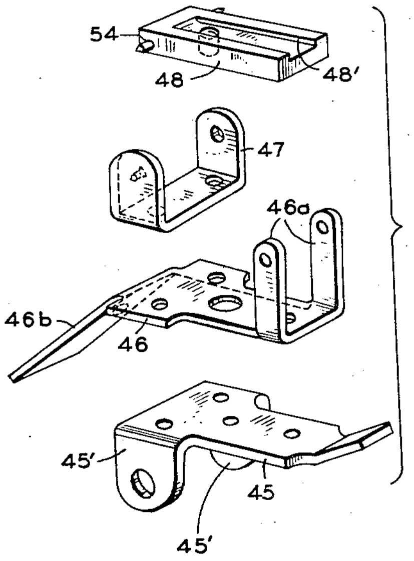
Figure 10:
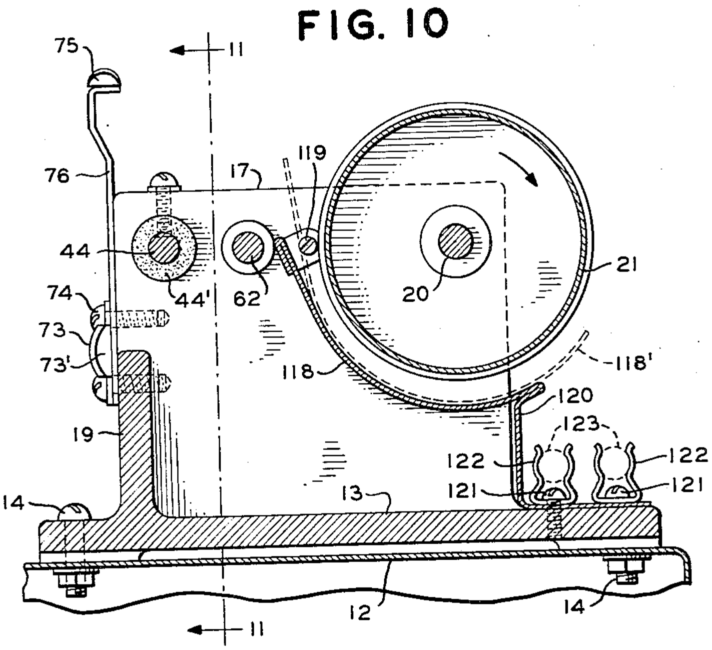

Figs. 7 and 8 are sectional views on lines 7—7 and 8—8 respectively of Fig. 6;

Fig. 9 is an exploded view of the stylus mounting;

Fig. 10 shows a transverse section on the line 12—12 of Fig. 2; and

Figure 11:
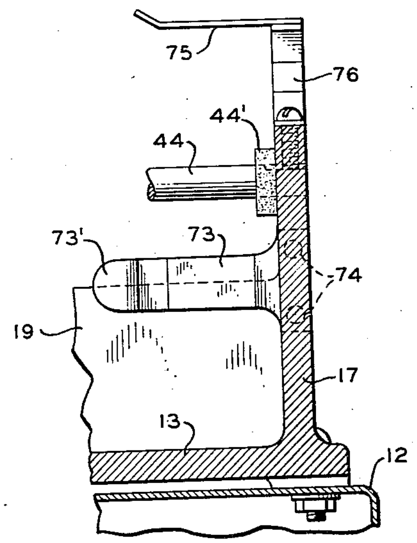

Fig. 11 is a section on the line 13—13 of Fig. 10.

Figure 1:
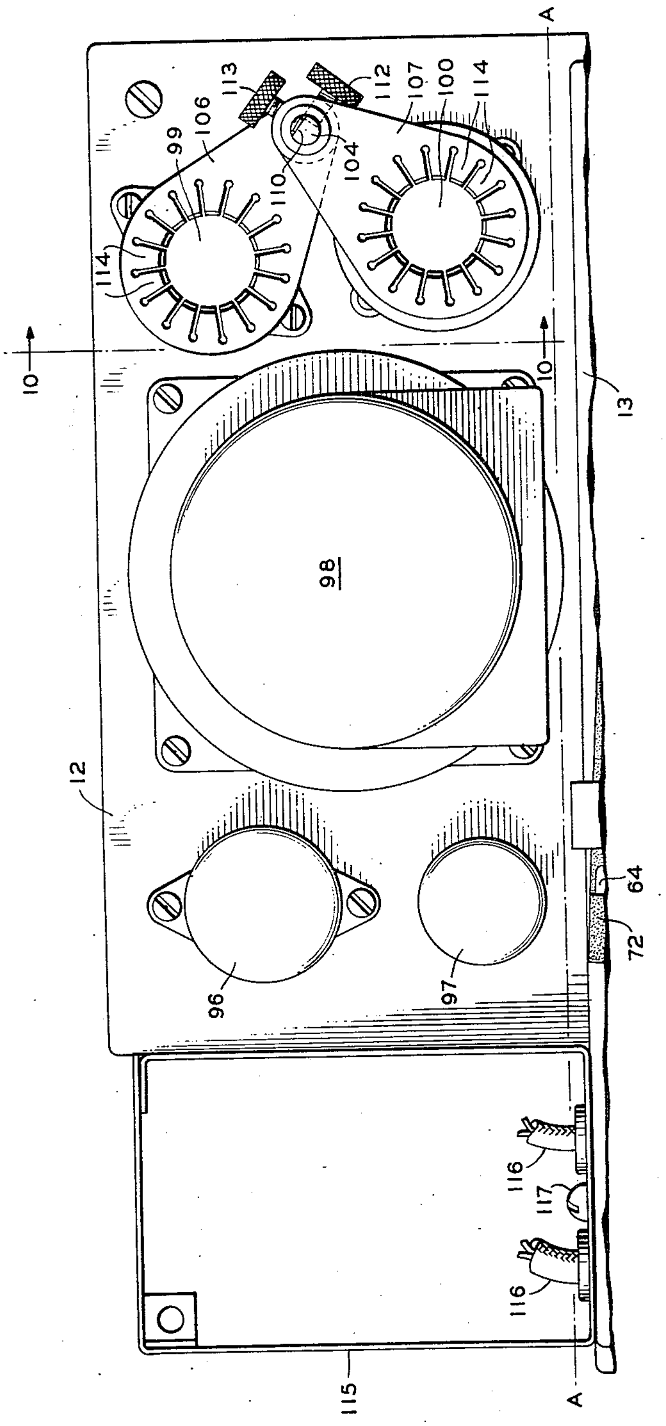
Figure 3:
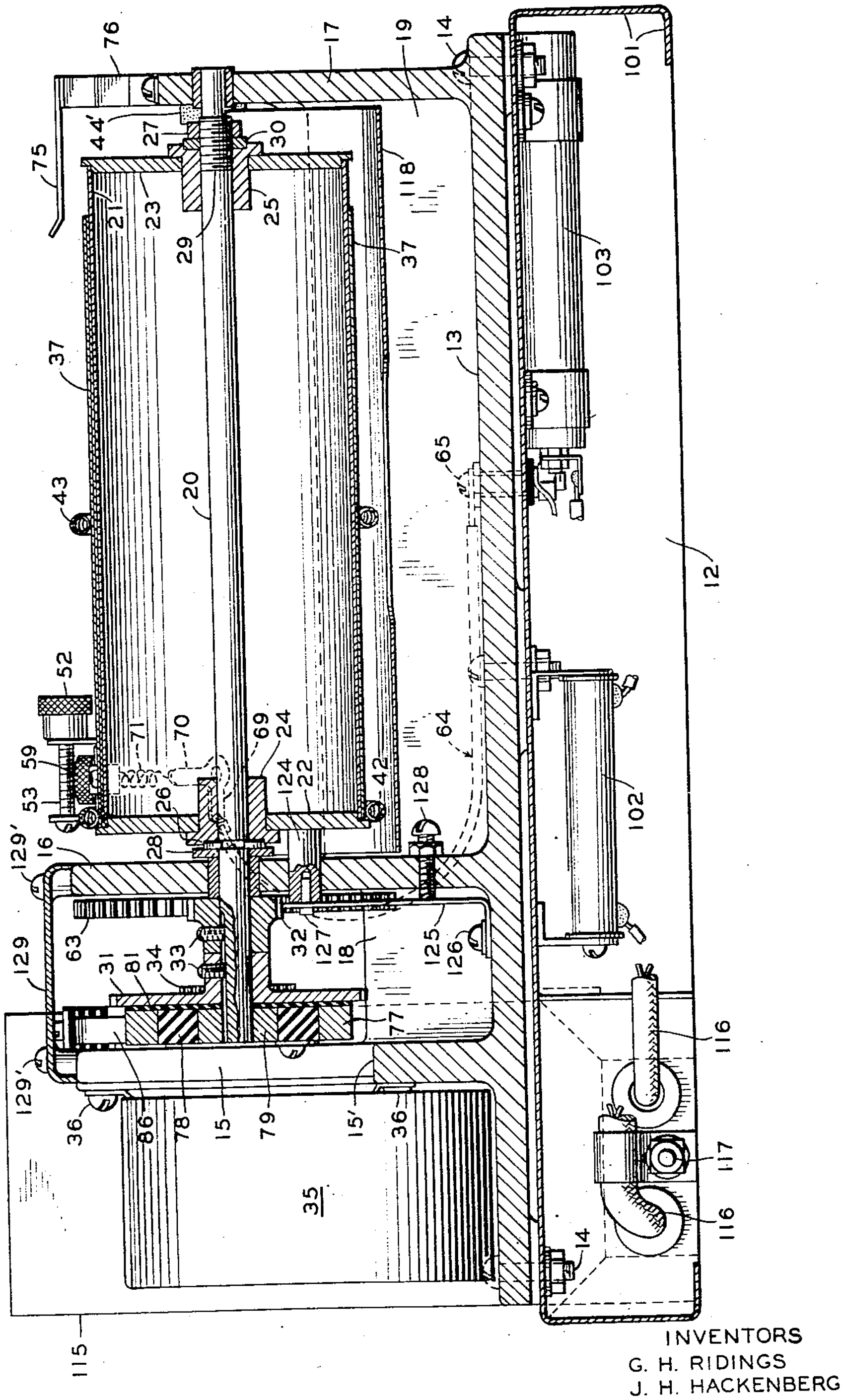
Fig. 3 is a longitudinal section on line 3—3 of Fig. 2.

Referring to Figs. 1, 2 and 3, there is a hollow base or chassis 12 of sheet metal on which a main casting 13 is mounted and secured in place at the corners by screws or bolts 14. The casing 13, preferably of aluminum, has three vertical plates or risers 15, 16 and 17. The plates 16 and 17 are rectangular (Figs. 4 and 10) but the left plate 15 is cut away at 15' (Figure 3) to provide access to certain parts, as will appear later. The vertical plates 15 and 16 are connected at the rear by a rib 18 and another rib 19 connects the plates 16 and 17. The elements 15 to 19 are integral portions of casting 13 which constitutes a unitary supporting frame on the base of the machine.

A rotary shaft 20 is journalled in plates 16 and 17 (Fig. 3) and supports a scanning drum 21 which is a metal cylinder (usually a piece of aluminum tubing) supported on a pair of metal end disks 22 and 23. These disks are mounted on shaft 20 by means of bushings 24 and 25 through which the shaft passes loosely. The bushings 24 and 25 together with the parts mounted thereon are locked in position on shaft 20 by a key 26 at one end and a nut 27 at the other end. The key 26 is a slotted disk seated in a groove in shaft 20 and forming an abutment for bushing 24. A thrust washer 28 prevents unnecessary friction of slotted disk 26 against the bearing in plate 16. The right end of drum shaft 20 is screw-threaded at 29, so that the adjustment of nut 27 locks the drum assembly to the shaft to rotate therewith as a unit. A lock washer 30 holds the nut 27 in adjusted position.

It should be pointed out that the drum parts 21 to 25 are separate pieces which are separately mounted on shaft 20 as the latter is slipped into position from the left through supporting plate 16 to 17. It is only when the nut 27 is finally tightened that the assembled parts 21 to 25 are united into a single structure mounted on shaft 20 and rotatable therewith. The parts comprising the drum are of good conducting metal which is permanently grounded to the frame of the machine.

The left end of drum shaft 20 extends beyond the plate 16 and carries two gears 31 and 32 which are locked to the shaft by set screws 33. The large gear 31 is permanently in mesh with a pinion 34 fixed on the shaft of a small synchronous motor 35 which is mounted on plate 15 by screws 36. The operation of motor 35 is therefore always accompanied by rotation of the drum 21 at the required speed. In this particular machine, as used in our system, the scanning speed of the drum is low (for example, 50 R. P. M.) Because of certain limitations inherent in the small portable facsimile transmitter which was designed for economy, our system gives a more dependable operation at low transmitter speed. Of course, in the broader use of our transmitter the scanning speed of drum 21 can be raised to the required degree by varying the transmission ratio between the driving motor 35 and the drum shaft 20.

The subject sheet or blank 37 is held on the drum 21 by spring garters 42 and 43 which roll easily along the drum to keep the sheet tightly wound up for scanning. As shown in Figs. 2 and 3, the end disks 22 and 23 of drum 21 project sufficiently beyond the drum to prevent the garters 42 and 43 from slipping off.

The upright cross plates 16 and 17 support a horizontal rod 44 on which a stylus carriage SK is slidably mounted in operative relation to the scanning drum 21. The ends of rod 44 are provided with resilient bumpers 44' (such as felt or rubber) to act as stops for the carriage. The construction of stylus carriage SK, as shown in Figs. 4 to 9, comprises in the main a bottom plate 45, an upper strip 46, a channel piece 47 and a block 48 of insulating material. The bottom plate 45 has a pair of depending ears 45' which have holes to receive the guide rod 44 in a smoothly sliding fit. The strip 46 has a pair of upstanding ears 46a and a depending tail 46b at the rear. A half-nut 49 is attached to the underside of plate 45 by screws 50 and 50'. The screw 50 also passes through the strip 46, which is secured to plate 45 by two additional screws 51. These screws also secure the channel piece 47 on top of strip 46. The ears 46a of strip 46 support an insulating finger piece 52 at the end of a cross pin or screw 53 for easy manipulation of the stylus carriage.

The insulating block 48 carries a cross pin 54 which is pivoted at its ends in the sides of channel piece 47. An adjustable bearing 55 (Fig. 8) makes it easy to mount the block 48 for a floating pivotal movement. This block has a groove 48' for receiving a spring strip 56 which is clamped in place by a plate 57, a screw 58 and a thumb nut 59. The spring strip 56 is bent down at its front end to hold a stylus 60, which is a short piece of steel wire fixed in position by solder 61 or otherwise.

Figure 4:
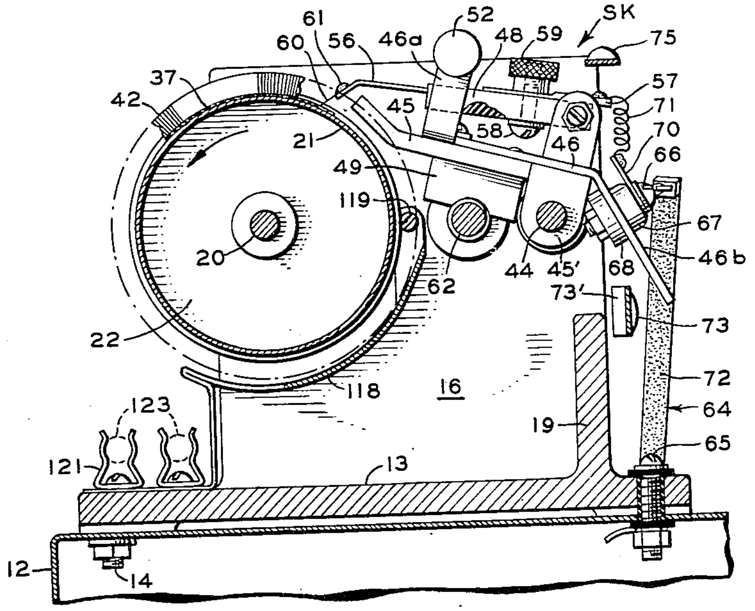
Fig. 4 is a transverse section on line 4—4 of Fig. 2 with the stylus carriage in forward or operative position.

It will thus be seen that the stylus 60 is pivoted on the insulating block 48 and is held by the spring strip 56 at the correct angle for scanning, as shown in Figs. 4 and 6. The weight of block 48 and the parts mounted thereon determines the pressure with which the stylus 60 bears down on the paper, this pressure being very light. For convenience the block 48 may be called the stylus holder.

When the stylus carriage SK is down in scanning position as illustrated in Figs. 4 and 6, the half-nut 49 engages a feed screw 62 which is journalled in the cross plates 16 and 17 in parallel relation to the drum 21. The left end of feed screw 62 extends beyond the plate 16 and carries a large gear 63 (Fig. 2) which meshes permanently with pinion 32 on the drum shaft 20. It is thus clear that when the synchronous motor 35 is energized it drives the drum 21 and the feed screw 62 simultaneously at their respective predetermined speeds as required in any particular installation. The finger piece 52 serves as a convenient handle for moving the stylus carriage to the two positions shown in Figs. 4 and 5. When the carriage is thrown back, the half-nut 49 is clear of the feed screw 62 and the carriage is free to be shifted by hand along the guide rod 44.

We do not depend on the weight of the stylus carriage SK to hold the half-nut 49 in firm engagement with the rotating feed screw 62 during a scanning operation. A constant downward pressure is exerted on the half-nut by a tensioned U-shaped leaf spring 64, which is fastened at its lower end to the base casting 13 by an insulated screw 65 (Figs. 2 and 4). The upper end of spring 64, which is usually of Phosphor bronze, is attached to the stylus carriage by means of an insulated connection shown best in Fig. 6.

A screw 66 is mounted on the tail extension 46b of strip 46 and insulated therefrom by washers or bushings 67 and 68 of Bakelite or similar material. A right angled connector having arms 69 and 70 (Fig. 2) is mounted on bushing 67 by the screw 66. The upper end of spring 64 is connected to arm 69 in any practical way, as by a conducting link, and the arm 70 is connected to the rear end of clamp 57 by a flexible conductor 71, which is soldered in place at both ends. It will be seen from this that the stylus 60 is electrically connected through the spring 64 to the insulated binding post 65, this connection being part of the stylus circuit to be described later. The spring 64 is preferably enclosed in a flexible insulating sheath 72.

The electrical spring connection 64 also performs the mechanical function of assisting to hold the half-nut 49 pressed down against the feed screw 62, as will be clear from Fig. 4. As the stylus carriage slides along the drum 21 from left to right during scanning, the upper end of spring 64 moves with it and the constant upward pressure of the attached spring tends to rock the carriage forward (leftward as viewed in Fig. 4) about the guide rod 44. This spring action maintains the half-nut 49 in firm driving contact with the feed screw 62. It is to be understood that the leaf spring 64 is sufficiently flexible to follow the movements of the stylus carriage.

Figure 5:
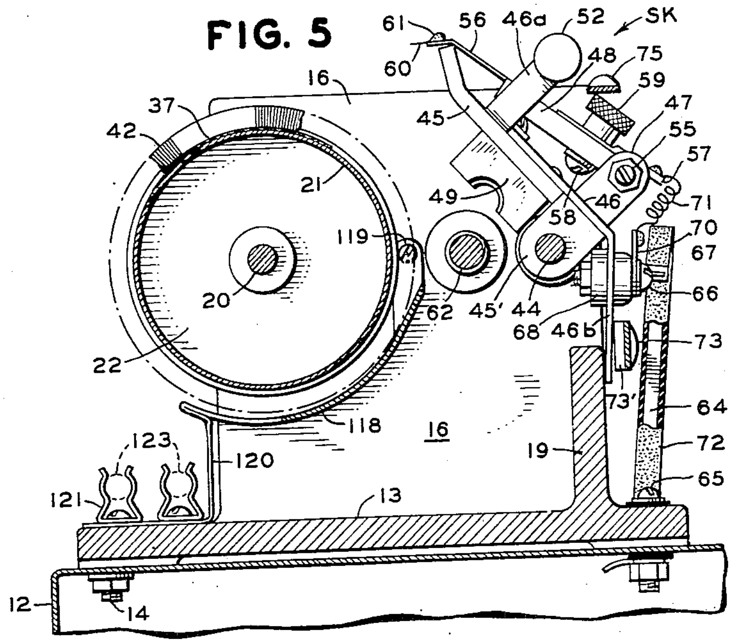
Fig. 5 is similar to Fig. 4 with the stylus carriage thrown back to rest position.

A comparison of Figs. 4 and 5 shows that when the carriage SK is down in scanning position, the stylus holder 48 is free to rock about its pivot 54 (Fig. 8) so that the stylus 60 is in pressure contact with the sheet on the drum. When the carriage is thrown back, the stylus holder rocks down with respect to the bottom plate 45 until the front end of arm 56 rests on the tip of the plate, as shown in Fig. 5. The carriage will not stay automatically in thrown-back position because it is overbalanced toward the drum 21 by its own weight and by the pressure of spring 64. We have therefore provided means for locking the stylus carriage in raised or rest position when required.

Looking at Figs. 10 and 11, there is a stiff spring latch 73 secured to the rear edge of plate 17 by screws 74. This latch extends leftward in spaced relation to rib 19 and terminates in a divergent tip 73'. When the stylus carriage SK is in raised position and is pushed toward the right, the tail 46b of the carriage frame rides along the rear rib 19 and is guided by the divergent tip 73' into automatic engagement with the latch 73 (Fig. 5). The carriage is now sustained in raised position, leaving the drum 21 free for reloading. By merely shifting the carriage to the left, the operator releases it from the latch 73 so that it can be lowered to scanning position.

Since our transmitter is a portable machine that may receive rough handling in transport, it is desirable to lock not only the frame of the stylus carriage in raised position, as above described, but also the stylus holder 48 which normally swings loose on the carriage frame. For this purpose we provide a separate spring latch 75 (Figs. 10 and 11) which is shown as a horizontal extension of an upright strip 76 attached to plate 17 by the screws 74. When the stylus carriage is shifted in raised position to the extreme right, the spring latch 75 engages the top of thumb nut 59 and bears down on it, so that the stylus arm 56 is held pressed against the tip of the carriage plate 45 (Fig. 5). In this way the entire stylus carriage SK is locked as a unit in raised position so that no part of it can flop around during handling or transporting of the machine.

It is understood that the specific embodiment disclosed is not to be considered as limiting the invention as defined in the following claims.

What is claimed is:

1. In a facsimile machine, a stylus carriage mounted on a track for sliding and pivotal movements so that it can be swung in one direction to scanning position and in the other direciton to rest position, a spring having one end secured to a fixed point on said facsimile machine and having the other end secured to said stylus carriage thereby normally urging the carriage to scanning position, and latching means for locking the carriage in rest position against the action of said spring.

2. Facsimile scanning mechanism comprising a stylus carriage mounted for sliding and pivotal movements, a half-nut fixedly mounted to said carriage arranged to engage a rotary feed screw for effecting the scanning movement of the carriage, an arm pivotally mounted on said carriage and supporting a stylus, means independent of the carriage for exerting pressure on the stylus point during scanning, and a spring connected to said carriage and to a fixed point for constantly pressing said half-nut against the feed screw during a scanning operation.

3. Facsimile scanning mechanism comprising a stylus carriage mounted for slidable and pivotal movements, a frame pivoted on said carriage and supporting an insulated electric stylus, a half-nut fixedly mounted to said carriage arranged to engage a rotary feed screw, and a leaf spring connected at one end to said carriage and at the other end to a fixed point for constantly pressing said half-nut against the feed screw during the scanning movement of the carriage, said leaf spring being flexible to adjust itself automatically to the sliding and pivotal movements of the carriage.

4. Facsimile scanning mechanism comprising a stylus carriage mounted for slidable and pivotal movements, an insulated frame pivoted on said carriage and supporting an electric stylus, a half-nut on said carriage arranged to engage a rotary feed screw, an insulated binding post on said carriage, an electric connection between said stylus and binding post, and a substantially U-shaped leaf spring having one end connected to said binding post and the other end connected to an insulated terminal for constantly pressing said half-nut against the feed screw during the scanning movement of the carriage, said leaf spring also acting as a flexible conductor which adjusts itself automatically to the sliding and pivotal movements of the carriage for connecting the stylus to said insulated terminal.

5. A facsimile machine having a rotary drum for supporting a sheet of paper in scanning position, a track supported parallel with said drum, a stylus carriage slidably and pivotally mounted on said track so that the carriage can be manually swung down to scanning and up to rest position, a frame pivoted on said carriage and supporting an insulated stylus in operative relation to the scanning drum, a rotary feed screw arranged parallel with said drum, a half-nut on the carriage for engaging said feed screw when the carriage is in scanning position, whereby the carriage is moved along the track to drive the stylus across the paper, said half-nut being free to disengage the feed screw when the carriage is swung back to rest position, and a flexible spring connected at one end to said carriage and at the other end to a fixed point for pressing the half-nut constantly against the feed screw during the scanning movement of the carriage, said spring being constructed to adjust itself automatically to the sliding and pivotal movements of the carriage.

References Cited in the file of this patent

UNITED STATES PATENTS

| | | |
|---|---|---|
| 1,666,330 | Ferree | Apr. 17, 1928 |
| 2,153,858 | Wise | Apr. 11, 1939 |
| 2,365,741 | Wise | Dec. 26, 1944 |